United States Patent
Chen

(10) Patent No.: US 10,394,074 B2
(45) Date of Patent: Aug. 27, 2019

(54) COLOR FILM SUBSTRATE AND METHOD OF MANUFACTURING THE SAME, LIQUID CRYSTAL PANEL

(71) Applicant: Shenzhen China Star Optoelectronics Technology Co., Ltd., Shenzhen, Guangdong (CN)

(72) Inventor: Lixuan Chen, Guangdong (CN)

(73) Assignee: SHENZHEN CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 15/974,488

(22) Filed: May 8, 2018

(65) Prior Publication Data

US 2019/0196261 A1 Jun. 27, 2019

Related U.S. Application Data

(63) Continuation of application No. PCT/CN2018/073980, filed on Jan. 24, 2018.

(30) Foreign Application Priority Data

Dec. 26, 2017 (CN) .......................... 2017 1 1437361

(51) Int. Cl.
G02F 1/1335 (2006.01)

(52) U.S. Cl.
CPC .. *G02F 1/133516* (2013.01); *G02F 1/133512* (2013.01); *G02F 1/133514* (2013.01)

(58) Field of Classification Search
None
See application file for complete search history.

(56) References Cited

U.S. PATENT DOCUMENTS

| 2017/0186922 | A1 | 6/2017 | Kim et al. |
| 2017/0242292 | A1 | 8/2017 | Jeon et al. |
| 2018/0203292 | A1* | 7/2018 | Kim .................. G02F 1/133512 |

FOREIGN PATENT DOCUMENTS

| CN | 105259693 A | 1/2016 |
| CN | 106647006 A | 5/2017 |
| CN | 106918950 A | 7/2017 |
| CN | 206773334 U | 12/2017 |

* cited by examiner

*Primary Examiner* — Richard H Kim
(74) *Attorney, Agent, or Firm* — Hauptman Ham, LLP

(57) ABSTRACT

This invention provides a color filter substrate including a substrate, a blue cut filter disposed on the substrate, and many color filter portions disposed on the blue cut filter. The color filter portions include many blue filter portions. The blue cut filter has different thicknesses in parts respectively corresponding to the blue filter portions. This invention also provides a method for manufacturing a color filter substrate, and a liquid crystal panel. This invention makes the parts of the blue cut filter under the respective blue filter portions different from each other, so that the parts of the blue cut filter corresponding to the respective blue filter portions have different abilities of weakening blue backlight. A color deviation by a viewing angle in the blue filter portion is improved. Each blue filter portion doesn't need a black light-shielding layer, being advantageous for improving an aperture ratio of the blue filter portion.

4 Claims, 2 Drawing Sheets

US 10,394,074 B2

COLOR FILM SUBSTRATE AND METHOD OF MANUFACTURING THE SAME, LIQUID CRYSTAL PANEL

RELATED APPLICATIONS

The application is a continuation application of PCT Patent Application No. PCT/CN2018/073980, filed Jan. 24, 2018, which claims the priority benefit of Chinese Patent Application No. 201711437361.2, filed Dec. 26, 2017, which is herein incorporated by reference in its entirety.

FIELD OF THE DISCLOSURE

The disclosure relates to a field of display technology, and more particularly to a color film substrate and a method of manufacturing the same, as well as a liquid crystal panel.

BACKGROUND

LCD (liquid crystal display) color is implemented by color filters (CF). However, traditional color filters have disadvantages such as a poor utilization of light, a low transmittance, a wide transmission peak for traditional color block material, a limited color density, and a difficulty to achieve wide color gamut, and thus cannot satisfy users demand to display quality. Quantum Dots (QDs) are spherical semiconductor nano-particles composed of Group II-V or Group III-V material. Particle size typically is in a range of a few nanometers to tens of nanometers. Due to a smaller half width and height of an emission peak and an easy adjustment to the color of the emitting light by means of adjusting the size, structure or composition of the quantum dot material, the quantum dot material can be used in a display device to effectively improve the color saturation and color gamut of a display device.

Quantum dot material can absorb blue light of short-wavelength and emit light of long-wavelength. This feature makes the blue light emitted by the blue backlight present red, green and other colors after being projected onto the quantum dot material. The current color filter of quantum dot can be divided into a blue filter portion, a red filter portion and a green filter portion. The red filter portion and the green filter portion are filled with quantum dot material that allows the user to receive red light or green light at all angles. The blue filter is usually filled with transparent material, or even nothing, for needs to transmit blue light. This will lead to appear a color deviation problem in the blue filter due to different viewing angles.

In order to improve the color deviation of the blue filter due to a viewing angle, a conventional method is to insert a black filter into the blue filter portion. However, this makes the transmittance of the blue filter portion decrease, which is not good for increasing an aperture ratio of the blue filter portion.

SUMMARY

In order to solve the problems existing in the prior art, a purpose of the present invention is to provide a color filter substrate capable of increasing the aperture ratio of a blue filter portion, a method of fabricating the same, and a liquid crystal panel.

According to one aspect of the present invention, the present invention provides a color filter substrate including a substrate, a blue cut filter disposed on the substrate, and a plurality of color filter portions disposed on the blue cut filter. The plurality of color filter portions include a plurality of blue filter portions. The blue cut filter has different thicknesses in parts respectively corresponding to the blue filter portions.

Furthermore, the plurality of color filter portions further include a plurality of red filter portions and a plurality of green filter portions, and the thicknesses of the blue cut filter where the blue filter portions are formed are respectively different from those where the red filter portions and the green filter portions are formed.

Furthermore, the thickness of the blue cut filter where the red filter portion is formed is the same as the thickness of the blue cut filter where the green filter portion is formed.

Furthermore, the color filter substrate further includes a black matrix disposed between adjacent color filter portions.

According to another aspect of the present invention, there is also provided a method for manufacturing a color filter substrate, which includes: forming a blue cut filter on a substrate; processing the blue cut filter where blue filter portions are to be formed to make the thicknesses of the blue cut filter where the respective blue filter portions are to be formed are different from each other; and forming the plurality of blue filter portions on the blue cut filter such that the blue filter portions are respectively located on corresponding processed portions of the blue cut filter.

Furthermore, the manufacturing method further comprises: forming a plurality of red filter portions and a plurality of green filter portions on the blue cut filter; the thicknesses of the blue cut filter where the blue filter portions are formed are respectively different from the thicknesses of the blue cut filter where the red filter portions and the green filter portions are formed.

Furthermore, after processing the portions of the blue cut filter corresponding to the respective blue filter portions to be formed, and before forming the plurality of blue filter portions on the blue cut filter, the manufacturing method further includes: forming a black light-shielding layer on the blue cut filter.

Furthermore, the manufacturing method further includes: processing the black light-shielding layer to form a black matrix between adjacent color filter portions.

According to still another aspect of the present invention, there is also provided a liquid crystal panel, comprising: a color filter substrate, an array substrate opposite to the color filter substrate, and a liquid crystal disposed between the color filter substrate and the array substrate. The color filter substrate is a color filter substrate mentioned above or a color filter substrate manufactured by the above-mentioned manufacturing method.

The present invention makes the portions of the blue cut filter disposed under the respective blue filter portions different from each other, so that the respective parts of the blue cut filter that correspond to the respective blue filter portions have different abilities of weakening blue backlight. A color deviation by a viewing angle in the blue filter portion is thus improved. Moreover, each of the blue filter portions is not necessary to be provided with a black light-shielding layer, which is advantageous for improving an aperture ratio of the blue filter portion.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures.

DETAILED DESCRIPTION OF PREFERRED EMBODIMENTS

Figure 1:
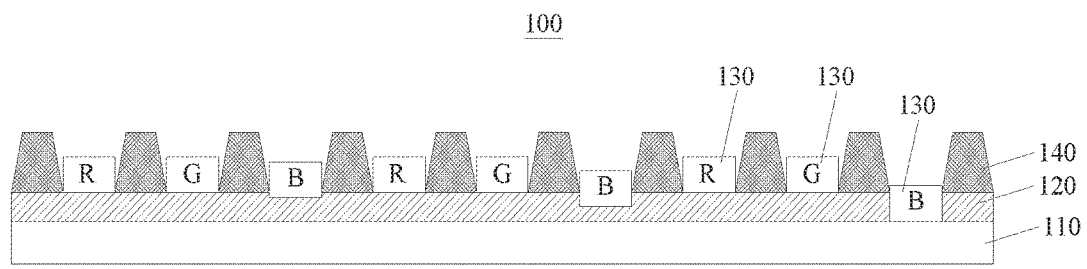
FIG. 1 is a schematic structural view of a color filter substrate according to an embodiment of the present invention.

In order to understand the above objectives, features and advantages of the present disclosure more clearly, the present disclosure is described in detail below with references to the accompanying drawings and specific embodiments. It should be understood that the specific embodiments described herein are merely used to explain the present invention, and are not intended to limit the present invention.

In the drawings, the thickness of layers and regions is exaggerated for clarity. The same reference number indicates the same element throughout the specification and the drawings.

FIG. 1 is a schematic structural view of a color filter substrate according to an embodiment of the present invention.

Referring to FIG. 1, a color filter substrate 100 according to an embodiment of the present invention includes a substrate 110, a blue cut filter 120, and a plurality of color filter portions 130.

The blue cut filter 120 is disposed on the substrate 110. The blue cut filter 120 serves to weaken the blue backlight provided by the backlight module. The plurality of color filter portions 130 are disposed on the blue cut filter 120.

Furthermore, a plurality of color filter portions 130 are arranged in an array. The plurality of color filter portions 130 include a plurality of blue filter portions B. In this embodiment, the blue filter portion B can be a transparent material, and even the blue filter portion B can be not any material, but just an interval of space.

In order to avoid a problem resulting from inserting a black light-shielding layer into the blue filter portion B so as to reduce a light transmittance of the blue filter portion B, in the present embodiment, respective parts of blue cut filter 120 corresponding to respective blue filter portions B have different thicknesses. That is, the respective parts of the blue cut filter 120 under the respective blue filter portions B have different abilities of weakening blue backlight. A color deviation of the blue filter portion B by a viewing angle is thus improved, and it is not necessary to provide each blue filter portion B with a black light-shielding layer. This helps to improve an aperture ratio of the blue filter portion.

In addition, the plurality of color filter portions 130 further includes a plurality of red filter portions R and a plurality of green filter portions G. In the present embodiment, the red filter portion R has a red quantum dot material and the green filter portion G has a green quantum dot material, but the present invention is not limited thereto.

Furthermore, the thickness of the part of the blue cut filter 120 corresponding to the blue filter portion B is respectively different from the thickness of the part of the blue cut filter 120 corresponding to the red filter portion R and the thickness of the part of the blue but filter 120 corresponding to the green filter portion G. In general, the part of the blue but filter 120 corresponding to the red filter portion R and the part of the blue cut filter 120 corresponding to the green filter portion G are not thinned. Therefore, the thickness of the part of the blue cut filter 120 corresponding to each blue filter portion B is smaller than the thickness of the part of the blue cut filter 120 corresponding to the red filter portion R and the thickness of the part of the blue cut filter 120 corresponding to the green filter portion G.

Furthermore, in this embodiment, the thickness of the part of the blue cut filter 120 corresponding to the red filter portion R, i.e., the portion of the blue cut filter 120 located under the red filter portion R, is same to the thickness of the part of the blue cut filter 120 corresponding to the green filter portion G, i.e., the portion of the blue cut filter 120 under the green filter portion G. But the present invention is not limited to this.

The color filter substrate 100 according to the embodiment of the present invention further includes a black matrix 140. The black matrix 140 is usually disposed in a space between adjacent color filter portions 130 to shield the components, such as wirings, opposite to the space.

Figure 2A:
FIGS. 2A to 2C are process flows of manufacturing a color filter substrate according to an embodiment of the present invention.
Figure 2B:
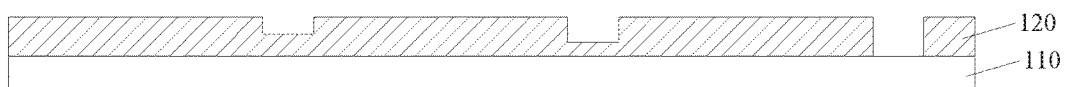
Figure 2C:
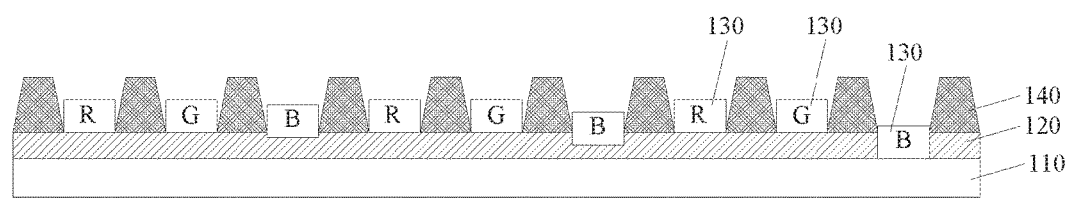

The method of manufacturing the color filter substrate 100 according to the embodiment of the present invention will be described in detail below. FIGS. 2A to 2C are process flows of manufacturing a color filter substrate according to an embodiment of the present invention.

The manufacturing method of the color filter substrate 100 according to the embodiment of the present invention includes steps 1 to 3.

Step 1: Referring to FIG. 2A, a blue cut filter 120 is formed on the substrate 110.

Step 2: Referring to FIG. 2B, parts of the blue filter film 120 corresponding to the respective blue filter portions B to be formed are processed so as to make the thicknesses of the parts of the blue cut filter 120 corresponding to the respective blue filter portions B be different from each other.

Step 3: Referring to FIG. 2C, a plurality of blue filter portions B are formed on the blue cut filter 120. Each blue filter portion B is disposed on a corresponding processed portion of the blue cut filter 120.

Furthermore, in Step 3, referring to FIG. 2C, a plurality of red filter portions R and a plurality of green filter portions G may be further formed on the blue cut filter 120.

Furthermore, after Step 2 and before Step 3, a black light-shielding layer 140A is formed on the processed blue cut filter 120. The black light-shielding layer 140A is exposed and developed so as to form a black matrix 140 between adjacent color filter portions 130.

Figure 3:
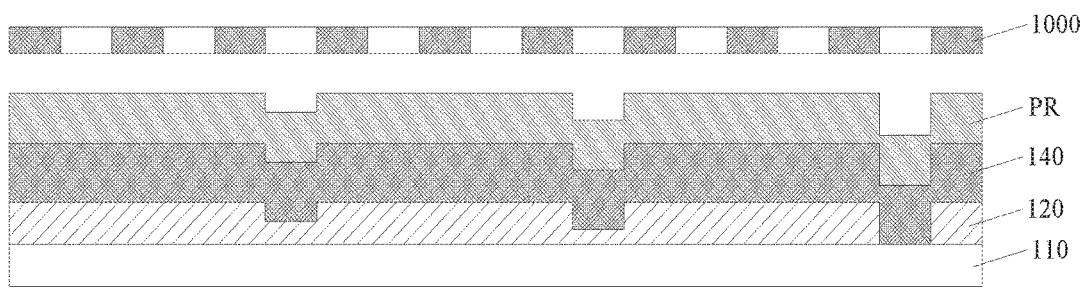
FIG. 3 is a schematic diagram of forming a black matrix according to an embodiment of the present invention.

FIG. 3 is a schematic diagram of forming a black matrix according to an embodiment of the present invention. Referring to FIG. 3, a photoresist layer PR is provided on the black light-shielding layer 140A. The photoresist layer PR is exposed under a mask 1000, and the exposed photoresist layer PR is developed. The black light-shielding layer 140A is then etched by means of an etching process to form a black matrix 140 as shown in FIG. 2C.

Figure 4:
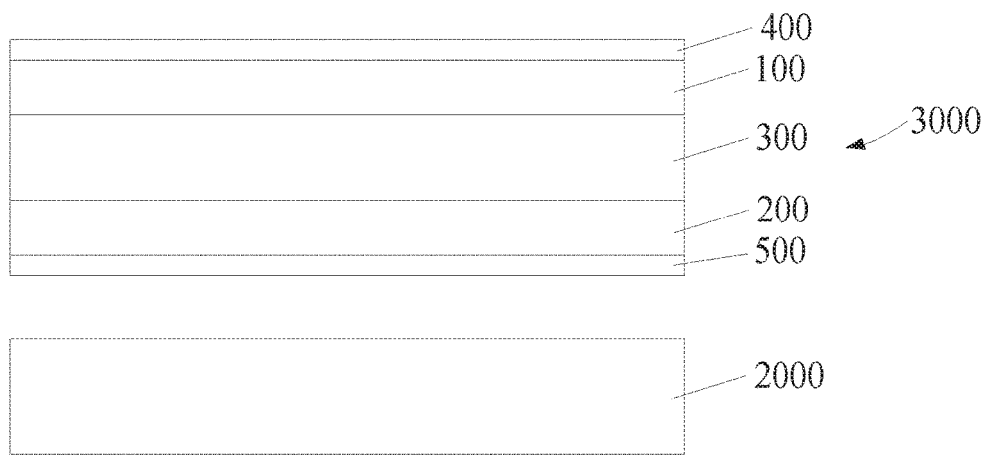
FIG. 4 is a schematic structural view of a liquid crystal display according to an embodiment of the present invention.

FIG. 4 is a schematic structural view of a liquid crystal display according to an embodiment of the present invention.

Referring to FIG. 4, a liquid crystal display according to an embodiment of the present invention includes a backlight module 2000 and a liquid crystal panel 3000. The backlight module 2000 and the liquid crystal panel 3000 are disposed opposite to each other so that the backlight module 2000 provides light to the liquid crystal panel 3000 to make the liquid crystal panel 3000 do a display.

The liquid crystal panel 3000 includes a liquid crystal box formed by a color filter substrate 100, an array substrate 200, and a liquid crystal layer 300 sandwiched between the color filter substrate 100 and the array substrate 200; a first polarizer 400 on a first surface of the liquid crystal box, i.e., a surface of the color filter substrate 100 facing away from the array substrate 200; and a second polarizer 500 attached to a second surface of the liquid crystal box, i.e., a surface of the array substrate 200 facing away from the color filter substrate 100. The backlight module 2000 faces the second polarizer 500. Furthermore, the backlight module 2000 may be, for example, a direct type backlight module or an edge type backlight module, which is not limited in the present invention.

In summary, according to the color filter substrate and the manufacturing method thereof according to the embodiments of the present invention, the portions of the blue cut filter disposed under the respective blue filter portions are different from each other, so that respective parts of the blue cut filter corresponding to the respective blue filter portions have different abilities to weaken the blue backlight. A color deviation by a viewing angle in the blue filter portion is improved. And, it is not necessary to provide a black light-shielding layer in the blue filter portion, which has benefits to raise the aperture rate of the blue filter portion.

The foregoing contents are detailed description of the disclosure in conjunction with specific preferred embodiments and concrete embodiments of the disclosure are not limited to these description. For the person skilled in the art of the disclosure, without departing from the concept of the disclosure, simple deductions or substitutions can be made and should be included in the protection scope of the application.

What is claimed is:

1. A method for manufacturing a color filter substrate, comprising steps of:
    forming a blue cut filter on a substrate;
    processing the blue cut filter where blue filter portions are to be formed to make the thicknesses of the blue cut filter where the respective blue filter portions are to be formed are different from each other;
    forming a black light-shielding layer on the blue cut filter; and
    forming the plurality of blue filter portions on the blue cut filter such that the blue filter portions are respectively located on corresponding processed portions of the blue cut filter.

2. The method according to claim 1, wherein the manufacturing method further comprises: forming a plurality of red filter portions and a plurality of green filter portions on the blue cut filter, and wherein the thicknesses of the blue cut filter where the blue filter portions are formed are respectively different from the thicknesses of the blue cut filter where the red filter portions are formed and the thicknesses of the blue cut filter where the green filter portions are formed.

3. The method according to claim 2, wherein the thickness of the blue cut filter where the red filter portion is formed is the same as the thickness of the blue cut filter where the green filter portion is formed.

4. The method according to claim 1, wherein the manufacturing method further includes: processing the black light-shielding layer to form a black matrix between adjacent color filter portions.

* * * * *